United States Patent [19]

Rüther et al.

[11] Patent Number: 5,625,888

[45] Date of Patent: Apr. 29, 1997

[54] PROCESS FOR COMBINING TRANSMITTING/RECEIVING DEVICES OF A CORDLESS COMMUNICATION SYSTEM TO FORM A COMMUNICATING UNIT

[75] Inventors: Ralf Rüther; Ulrich Bartsch; Josef Baumeister, all of Deutschland, Germany

[73] Assignee: Siemens Aktiengesellschaft, Munich, Germany

[21] Appl. No.: 424,303

[22] PCT Filed: Oct. 13, 1993

[86] PCT No.: PCT/DE93/00978

§ 371 Date: Apr. 26, 1995

§ 102(e) Date: Apr. 26, 1995

[87] PCT Pub. No.: WO94/10785

PCT Pub. Date: May 11, 1994

[30] Foreign Application Priority Data

Oct. 30, 1992 [DE] Germany .......................... 42 36 778.6

[51] Int. Cl.$^6$ ................................................. H04B 7/00
[52] U.S. Cl. ..................... 455/56.1; 379/61; 455/54.1
[58] Field of Search ...................... 455/54.1, 54.2, 455/33.1, 56; 379/61, 62, 59; 370/79, 24

[56] References Cited

U.S. PATENT DOCUMENTS 5,202,912  4/1993  Breeden et al. ...................... 379/57
5,212,684  5/1993  MacNamee et al. ...................... 370/24
5,212,809  5/1993  Oka ........................................ 455/54.1
5,369,664  11/1994  Takahashi ................................. 375/1
5,416,778  5/1995  Chan et al. ............................ 370/95.1

FOREIGN PATENT DOCUMENTS 0301573  1/1989  European Pat. Off. .

OTHER PUBLICATIONS

"Struktur des DECT-Standards", Ulrich Pilger, Nachrichtentechnik Elektronik, vol. 42, No. 1, Jan. 1992, pp. 23–29.

"Der GSM-Standard", A. Mann, Informatik Spektrum, 14, No. 3, Jun. 1991, pp. 137–152.

Primary Examiner—Reinhard J. Eisenzopf
Assistant Examiner—Darnell R. Armstrong
Attorney, Agent, or Firm—Hill, Steadman & Simpson

[57] ABSTRACT

When base stations (BS1 . . . BSm) and mobile stations (MS1 . . . MSn) of a cordless communication system are combined to form a communicating unit, a supplementary message (M2) is transmitted, in addition to a DECT-specific message (M1), from base stations (BS1 . . . BSm) to the mobile station (MS1 . . . MSn) at a request stage. The mobile stations (MS1 . . . MSn) must synchronize to this supplementary message (M2) in order to be combined with the base stations (BS1 . . . BSm) at a registration stage. For this final combining, the mobile station (MS1 . . . MSn) must additionally legitimate itself as authorized mobile station with a legitimation word (I-LW) at the base stations (BS1 . . . BSm).

9 Claims, 5 Drawing Sheets

FIG 1
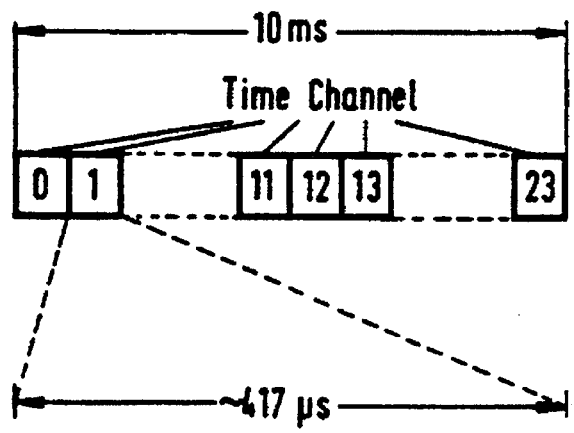
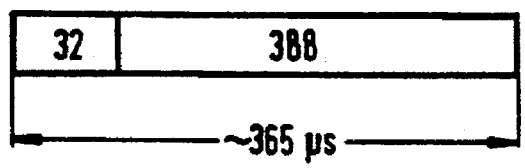
FIG 2
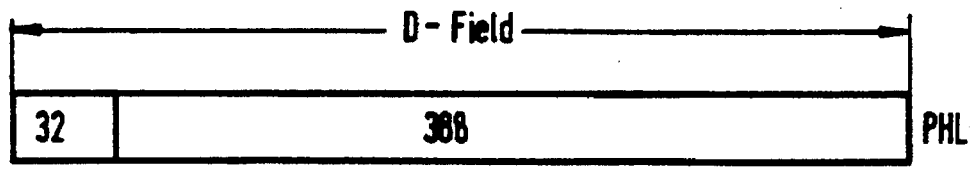
FIG 3
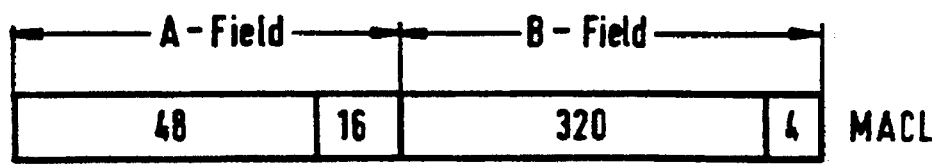

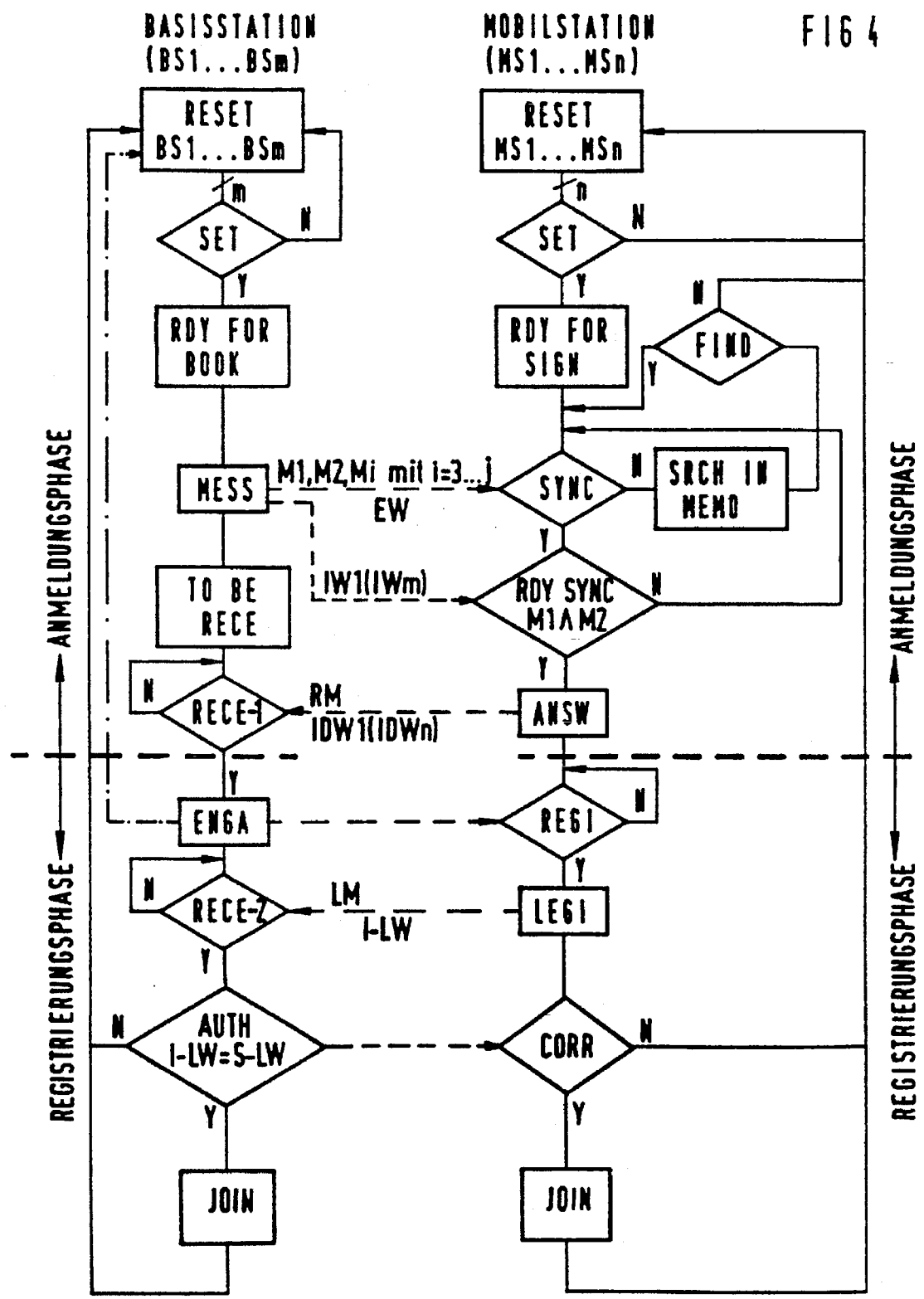

FIG 10
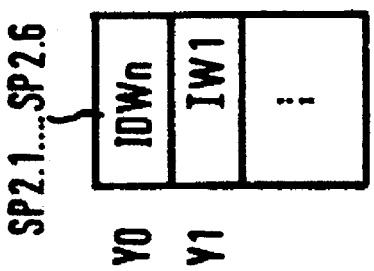
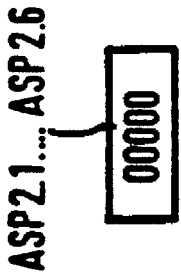
FIG 9
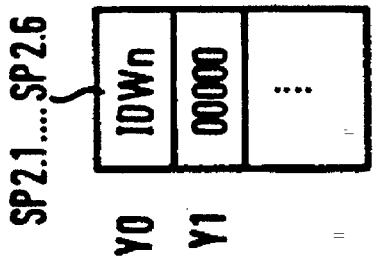
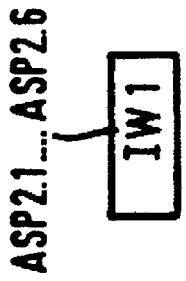
FIG 8
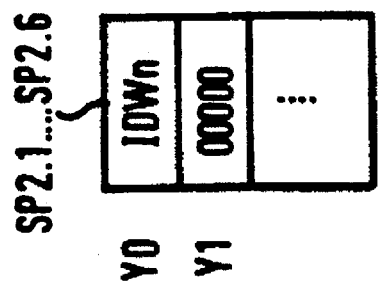
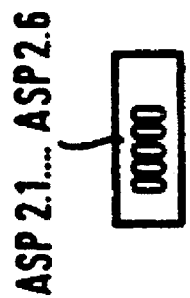

PROCESS FOR COMBINING TRANSMITTING/RECEIVING DEVICES OF A CORDLESS COMMUNICATION SYSTEM TO FORM A COMMUNICATING UNIT

BACKGROUND OF THE INVENTION

The invention relates to a process for combining transmitting/receiving devices of a cordless communication system to form a communicating unit.

The technical development of communication systems for the cordless transmission of voice and non-voice information is tied to various standards, analogously to the ISDN standard (Integrated Services Digital Network) which has existed for some time in line-connected communications. Apart from some national standards and several cross-boundary standards such as the CT1, CT1+ standard on analog basis and the CT2, CT3 standard on digital basis, a standard, the so-called DECT standard (Digital European Cordless Telecommunication; compare Nachrichtentechnik Elektronik, Berlin, Vol. 42, No. 1, 1-2/1992, pages 23 to 29, U. Pilger: "Struktur des DECT-Standards" (Structure of the DECT standard)), analogous to the global GSM standard (Groupe Spéciale Mobile or Global Systems for Mobile Communication; compare Informatik Spektrum, Springer Verlag Berlin, Vol. 14, No. 3, 1991, pages 137 to 152, A. Mann: "Der GSM-Standard—Grundlage für digitale europäische Mobilfunknetze") (the GSM standard—basis for digital European mobile radio networks) for mobile radio, has been created on a European scale for the lower-power cordless communication between portables and a base station, with ranges of some 100 meters. It is an essential feature of the DECT standard that the base station can be connected to line-connected communication networks (e.g. PSTN=Public Switched Telephone Network; PTN=Private Telecommunication Network).

For the cordless communication according to the DECT standard, a dynamic channel selection of approximately 120 available channels is carried out.

The 120 channels result from the fact that in the DECT standard, ten frequency bands between 1.8 and 1.9 GHz are used, a time-division multiplex frame of 10 ms being used in time-division multiplex access (TDMA) in each frequency band according to the representation in FIG. 1. In this time-division multiplex frame, 24 time channels (from 0 to 23) are defined which provides a frame structure. This frame structure is then used in such a manner that for each frequency band, 12 stations of a DECT system can operate simultaneously in duplex mode. A time slot of in each case 417 μs is allocated to the 24 time channels. This time slot specifies the time in which information (data) are transmitted. This type of transmitting information in duplex mode is also called the ping-pong method because transmission takes place at a particular time and reception takes place at another time. In this ping-pong method, one time frame or pulse (burst) of 365 μts is transmitted in each time slot, which approximately corresponds to a frame length of 420 bits. The succession in time of the transmitted pulses defines a channel, the so-called physical channel, with a data throughput of 42 kbit/s for the time slot, 6 kbit/s for a guard space used in order to avoid overlaps by adjoining time slots, and 1.152 Mbit/s for the time-division multiplex frame. In the DECT standard, the time frame shown in FIG. 2 is allocated to a physical layer (PH-L) and is frequently also called the D field.

In addition, a number of layers are defined in the DECT standard, analogously to the ISDN standard with the ISO/OSI 7-layer model. One of these layers is the physical layer (PH-L). Another layer is a Medium Access Control Layer (MAC-L) which is allocated an A field and a B field according to FIG. 3. The A field comprises 64 bits which, inter alia, are used for messages when combining the portables and base station of the DECT communication system. The B field comprises 324 bits, 320 bits of which are used for voice dam and 4 bits for detecting partial interferences of the pulse.

In its simplest form, the DECT communication system has a base station with at least one mobile station. More complex (e.g. networked) systems contain several base stations having in each case several mobile stations. Due to the 24 time channels defined in the DECT standard, up to 12 mobile stations can be allocated to the base station, which communicate with the base station in duplex mode. For the time-division multiplex frame of 10 ms, also defined in the DECT standard, duplex mode means that information is transmitted every 5 ms from the base station to a mobile station or conversely. So that the base station and mobile station can communicate with one another, it must first be ensured that the two stations (communication partners) are combined to form a communicating unit.

For this combining, a booking and registration procedure is carried out according to European reference EP-A2-0 301 573 (corresponding to U.S. Pat. No. 4,864,599). In this known booking and registration procedure, the combining between a base station and a mobile part is achieved as follows:

(1) Transmitting of a product-specific identification word from the base station to the mobile part which is ready for booking, (2) Checking of the received identification word in the mobile part (determining the correspondence with an identification word stored in the mobile part and subsequent acknowledgement of the agreement found), (3) Transmitting of a system- and telephone-specific identification code from the base station, (4) Storing of the identification code in a memory of the mobile part.

In spite of this known procedure used when combining base and mobile stations to form a communicating unit, it is still possible for outside users of a cordless communication system to be able to conduct unauthorized telephone calls with the aid of product-identical (identical product-specific code word) mobile stations via the base station of the cordless communication system when this is connected, for example, to a line-connected communication network.

SUMMARY OF THE INVENTION

It is the object of the invention to specify a process for combining transmitting/receiving devices of a cordless communication system to form a communicating unit by means of which the known disadvantages are avoided.

This object is achieved by a process of the present invention for combining transmitting/receiving devices of a cordless communication system to form a communicating unit. At a request stage at least one first transmitting/receiving device and at least one second transmitting/receiving device are brought into a combining-specific transmitting/receiving state. A first message is transmitted by the first transmitting/receiving device which is received by the second transmitting/receiving device and acknowledged in the form of a return message. Device-individual identification words, stored in the transmitting/receiving devices, are mutually exchanged and stored due to the request-stage-specific messages at a registration stage. In addition to the messages mutually transmitted by the transmitting/receiving devices, at least one further message is transmitted, at least one of which is generated by control procedures at a user interface of the transmitting/receiving device. The further message transmitted by the transmitting/receiving device is acknowledged by the receiving transmitting/receiving device due to a correspondence found with in each case a reference information corresponding to the further message and stored in the receiving transmitting/receiving device, before the device-specific code words are stored.

Advantageous further developments of the invention are as follows.

As further messages, a supplementary message is transmitted from the first transmitting/receiving device to the second transmitting/receiving device. A legitimation message generated by the control procedures at the second transmitting/receiving device is transmitted from the second transmitting/receiving device to the first transmitting/receiving device. In the case of a correspondence:

(1) of the supplementary message with the reference information stored in the second transmitting/receiving device, the second transmitting/receiving device is synchronized with the first transmitting/receiving device, (2) of the legitimation message with the reference information stored in the first transmitting/receiving device, the synchronization of the first transmitting/receiving device with the second transmitting/receiving device is legitimized.

The first transmitting/receiving device is a base station and the second transmitting/receiving device is a mobile station, of a DECT cordless telephone.

An actual legitimation word is transmitted as message content in the legitimation message and a nominal legitimation word is contained in the corresponding stored reference information.

A supplementary word is transmitted as message content in the supplementary message.

A 36-bit-long system information field, freely available in a MAC layer in the DECT standard, is allocated to the supplementary word.

Codes of the cordless communication system are allocated to the supplementary word.

In each case a number of first and second transmitting/receiving devices are combined in parallel.

A number of first and second transmitting/receiving devices are progressively combined from a waiting loop.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a time division multiplex frame according to the DECT standard,

FIG. 2 depicts allocations of the time frame to the D field,

FIG. 3 depicts allocations of the time frame to the A and B fields,

FIG. 4 shows a basic flow chart of a base station end mobile station for combining these to form a communicating unit, FIGS. 5 to 7 in each case show various memory states of the base station during the combining with a single mobile station, FIGS. 8 to 10 in each case show various memory states of the mobile station during the combining with the base station according to FIGS. 5 to 7.

DESCRIPTION OF THE PREFERRED EMBODIMENTS

Figure 7:
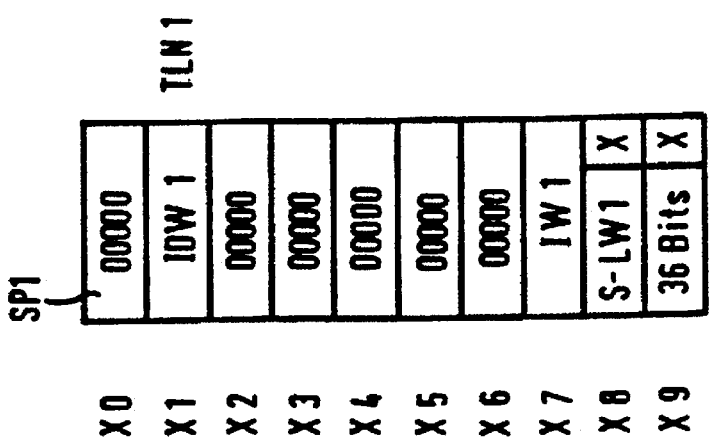

FIG. 4 shows a flow chart of base stations BS1 . . . BSm and mobile stations MS1 . . . MSn of a cordless communication system for combining these to form a communicating unit. The base stations BS1 . . . BSm and mobile stations MS1 . . . MSn are transmitting/receiving devices which can both transmit and receive.

For combining the transmitting/receiving devices, it is first assumed at a request stage that the base station BS1 . . . BSm and the mobile station MS1 . . . MSn are still in an OFF state. This OFF state is a substate of an INITIAL state ("RESET BS1 . . . BSm"), ("RESET MS1 . . . MSn") which is also associated with a COMMUNICATION state and a TRANSITION state (transition from a completed to a new combining procedure).

To pass from the INITIAL state to a START state ("SET"), keys are operated independently of one another in time at the base station BS1 . . . BSm and the mobile station MS1 . . . MSn. In the case of the mobile station MS1 . . . MSn, this is usually a combination of keys whilst in the case of the base station BS1 . . . BSn, if (a) it is also constructed as voice communication set or (b) as interface to an external communication network, it can also be a combination of keys or a special key. Since m base stations and n mobile stations can be allocated to the communication system, there can in consequence also be m and respectively n simultaneous or non-simultaneous switch-on processes. In FIG. 4, this is expressed by a "/" line in the "RESET/SET" transition.

In the text which follows, the combining of the base station BS1 and of the mobile station MS1 ("BS1×MS1" combination) of the m×n combinations for combining the base stations BS1 . . . BSm and mobile stations MS1 . . . MSn is to be described as representative of all others.

After the base station BS1 has been switched on ("SET" state), it is switched into a state of READINESS FOR BOOKING ("RDY FOR BOOK") and a MESSAGE state ("MESS"), for example by operating the special key. In this MESSAGE state, the base station BS1 automatically transmits at least one message, by means of which it informs the mobile station MS1 of its readiness for booking, in each kth time-division multiplex frame of 10 ms for a period of, for example, less than 30 seconds. In the present exemplary embodiment, the base station BS1 transmits, for example, two messages, a DECT-specific message M1 and a supplementary message with a supplementary word EW. The DECT-specific message M1 is a message which is transmitted in the A field of the MAC layer (Medium Access Control Layer) in a Q channel defined there. In this Q channel, attributes of the base station BS1 are transmitted in a 16-bit information field for layers defined above the PH layer (Physical Layer) and the MAC layer (Medium Access Control Layer) of the DECT standard (DECT transmission agreement) (Higher Layer Information). The DECT-specific message transmitted by the base station BS1 is such an attribute. The message is transmitted whenever a logical "1" is set at bit position 13 of the information field.

The supplementary message M2 can be, for example, a user-specific message which can be used for identifying a group of equipment allocated to the base station BS1 as in the present exemplary embodiment. Since this exemplary embodiment is a DECT-specific communication system, the transmission frame necessary for transmitting the supplementary message M2 within the time frame defined in the DECT standard must also be available for this.

In the DECT standard, it is possible to transmit various system information items in the A field of the MAC layer (Medium Access Control Layer) in a Q channel defined there. This range of transmittable system information items, in turn, contains a transmission sequence (ESCAPE sequence) to which no DECT-specific information content is allocated and which is therefore freely available. This ESCAPE sequence which is initiated by an initiating sequence (HEADER) of 4 bits with the bit combination of "0111", comprises a total of 36 freely available bits which are available for the supplementary word. According to the DECT transmission convention, the supplementary message M2 and the DECT-specific message M1 are alternating with another DECT message in every 8th of 16 (k=16) time-division multiplex frames.

To be able to receive the two messages M1, M2 transmitted by the base station BS1 in the MESSAGE state ("MESS"), the mobile station MS1 must be in a state of READINESS FOR SIGNAL ("RDY FOR SIGN"). The mobile station MS1 is switched from the SET state to the state of READINESS FOR SIGNAL by means of the aforementioned key combination.

If the mobile station MS1 is in this state and the two messages M1, M2 are transmitted by the base station BS1 during this state, the mobile station MS1 attempts to synchronize to these two messages M1, M2 in a SYNCHRONIZATION state ("SYNC"). Synchronization by the mobile station MS1 is not required, depending on the type of the message transmitted by the base station BS1. In the present exemplary embodiment, this applies to the DECT-specific message M1. This message is a type of message which is "easy to handle", in which any mobile station automatically receives an authorization for access to the base station BS1. As already mentioned in the introduction to the description, however, this is not desirable. The mobile station MS1, which only attempts to obtain the access authorization on the basis of the DECT-specific message M1 received in a state of END OF SYNCHRONIZATION ("RDY SYNC; M1"), is rejected by the base station BS1 because the latter is not in a state of READINESS FOR RECEPTION ("TO BE RECE"). The mobile station MS1 thus has no other option but to synchronize to the supplementary message M2, also transmitted by the base station BS1.

In distinction from the DECT-specific message M1, the supplementary message M2 is a user-individual message type in order to impede the access authorization for the base station BS1. It should be pointed out again at this point that it is also possible to transmit more than one supplementary message M2 (e.g. Mi, where i=3 ... j), in order to further impede the access authorization. A limit for such extensions is set, however, by the 36 bits of the ESCAPE sequence, at least with respect to the DECT standard.

The mobile station MS1 synchronizes to the supplementary message M2 by the mobile station MS1 searching for a synchronization information item corresponding to this supplementary message M2 in a SUCH state ("SRCH IN MEMO") in a memory allocated to it (e.g. a RAM or ROM etc.). If this search of the mobile station MS1 remains unsuccessful in a FIND state ("FIND"), the user of the mobile station MS1 cannot obtain the access authorization for the base station BS1. He will be rejected as unauthorized. This means that he can safely switch off the mobile station MS1 ("RESET MS1 ... MSn") temporarily in order to attempt, for example at a different time, to combine with one of the other base stations BS2 ... BSm.

If, however, this search of the mobile station MS1 is successful in the FIND state ("FIND"), synchronization is completed, provided no other supplementary messages Mi have been sent by the base station BS1 ("RDY SYNC; M1∧M2"). In this "RDY SYNC; M1∧M2" state, the mobile station MS1 receives, for example from the base station BS1 an individual BS1 identification word IW1 (IWm), which is permanently allocated to the base station BS1 during its manufacture and is undecodably stored in a programmable BS1 memory (BS1 storage location X7 of the BS1 memory SP1 according to FIGS. 5 to 7 and 11) of the base station. The BS1 identification word IW1 (IWm) received is temporarily stored in a main memory (MS1 main memory ASP2.1 according to FIG. 9) in the mobile station MS1.

The mobile station MS1 thereupon automatically transmits a return message RM to the base station BS1 in an ANSWER state ("ANSW"). With this returnmessage RM, an individual MS1 identification word IDW1 (IDWn), which is permanently allocated to the mobile station MS1 during its manufacture and is undecodably stored in a programmable MS1 memory (MS1 storage location Y0 of the MS1 memory SP2.1 according to FIGS. 8 to 10) of the mobile station MS1 is also transmitted via the mobile station MS1 and temporarily stored in a buffer (BS1 memory location X0 of the BS1 memory SP1 according to FIG. 6) in the base station BS1. After that, the mobile station MS1 automatically changes to a REGISTRATION state ("REGI"). This change concludes the request stage and the mobile station MS1 signals to the base station BS1 that a registration stage can now begin (declaration of readiness for the registration).

The base station BS1, which is already in a first RECEIVE state ("RECE-1") after the transmission of the last message and is waiting for this return message RM (feedback from a mobile station), immediately thereafter engages the mobile station MS1, which is in the REGISTRATION state ("REGI"), for the registration stage in an ENGAGE state ("ENGA") by means of a "clamp".

With the "clamping" of the mobile station MS1, the base station BS1 switches itself with respect to the readiness for booking ("SET"; "RDY FOR BOOK"; "MESS" states) from the ENGAGE state ("ENGA") to the INITIAL state ("RESET BS1 .. BSm") (dot-dashed arrow in FIG. 4). This prevents the other mobile stations MS2 ... MSn from obtaining the access authorization for the base station BS1 during the booking stage for the registration stage in which the mobile station MS1 is combined with the base station BS1. As soon as the registration phase has elapsed for the mobile station MS1 and the base station BSm, the mobile stations MS2 ... MSn again have the opportunity to obtain the access authorization for the base station BS1 in the request stage.

The case described above, in which mobile stations cannot obtain access authorization for a base station during a registration stage in progress occurs, in particular, when a number of mobile stations wish to obtain the access authorization in the period between the transmission of at least one message ("MESS" state) and the initial reception of a return message by the base station. In the present exemplary embodiment, this problem is solved in accordance with the principle "first sender of a return message is first".

As an alternative, however, there is also the possibility that all mobile stations registered during the specified period are progressively processed (a) in parallel by the base station or (b) remaining in a waiting loop, retaining the principle.

Figure 12:
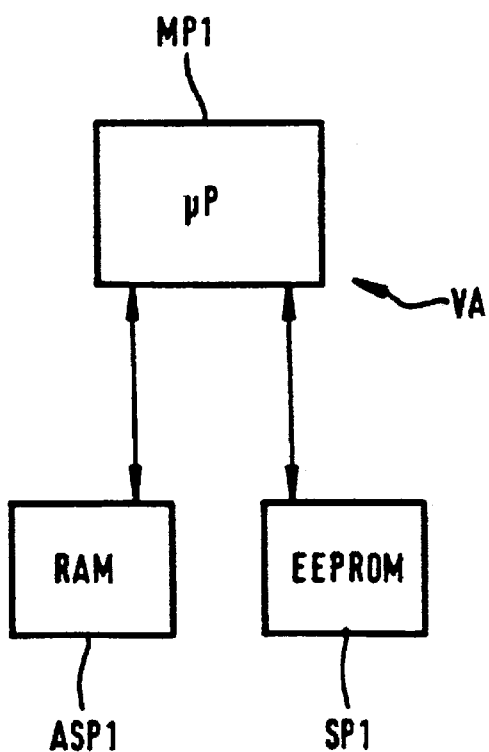
FIG. 12 shows a simple comparing arrangement for carrying out a nominal/actual comparison during the combining of the base station and mobile station.

With the "clamping" of the mobile station MS1 by the base station BS1, the base station BS1 automatically returns to a second RECEIVE state ("RECE-2") in which it waits for a legitimation message LM from the mobile station MS1. The mobile station MS1 transmits this legitimation message LM, immediately after it has been "clamped" by the base station BS1, in a LEGITIMATION stage ("LEGI") to the base station BS1. The legitimation message LM consists of a coded actual legitimation word I-LW which is generated by the user of the mobile station MS1 by pressing keys at the user interface of the mobile station MS1. The base station BS1, which has already waited for this legitimation message LM, checks in an AUTHORIZED state ("AUTH") whether the actual legitimation word I-LW received by it, with which the mobile station MS1 alleges to be authorized for registration in the base station BS1, is identical with a nominal legitimation word S-LW which is stored in a programmable BS1 memory (e.g. PROM, EPROM or EEPROM etc.) allocated to the base station BS1. This nominal/actual comparison can be carried out by means of a program in the base station BS1 or by means of a comparing arrangement implemented in the base station BS1, in which the comparing arrangement VA, according to FIG. 12, in its simplest form consists of a BS1 microprocessor MP1 as comparator, a BS1 main memory ASP1 allocated to the BS1 microprocessor (e.g. RAM) for storing the actual legitimation word I-LW, and the programmable BS1 memory, SP1 also allocated to the BS1 microprocessor, with the nominal legitimation word S-LW stored therein.

If the base station BS1 finds in the AUTHORIZED state ("AUTH") that the actual legitimation word I-LW does not correspond to the nominal legitimation word S-LW (I-LW≠S-LW), and thus the mobile station MS1 is not authorized for registration or the user of the mobile station MS1 is not authorized, it rejects the mobile station MS1, which, in the meantime, is in a CORRECT state ("CORR"), as unauthorized. The base station BS1 thereupon eliminates itself for registration by returning to the INITIAL state ("RESET BS1 ... BSm").

In correspondence therewith, the user of the mobile station MS1 can temporarily switch off the mobile station MS1 ("RESET MS1 ... MSn") after it has been rejected for registration by the base station BS1, in order to attempt then, for example at a different time, to combine with another base station.

If, however, the mobile station MS1 is authorized for the registration (I-LW=S-LW), the base station BS1 and the mobile station MS1 in each case change to a JOINED state ("JOIN"). In this state, the identification words IW1, IDW1, which have in each case been temporarily stored, are "permanently" stored as conclusion of the combining procedure (the BS1 identification word IW1 is stored at the MS1 storage location Y1 of the MS1 memory SP2.1 by the main memory ASP2.1 in the mobile station MS1 according to FIGS. 9 and 10 and the MS1 identification word IDW1 is stored at the BS1 storage location X1 by the BS1 storage location X0 in the base station BS1 according to FIGS. 6 and 7).

With this mutual storage of the identification words, the base station BS1 and mobile station MS1 have been combined to form the communicating unit. After this combining, the base station BS1 and mobile station MS1 are in each case reset to the initial state ("RESET BS1 ... BSm") and, respectively, ("RESET MS1 ... MSn") for any possible new combinations. In this INITIAL state, the base station BS1 and the mobile station MS1 can start a new combining procedure, in each case in the TRANSITION state, in which the base station BS1 is to be combined, for example, with the mobile stations MS2 ... MSn and the mobile station MS1 is to be combined with the base stations BS2 ... BSm, or can change to the COMMUNICATION state for setting up a communication link.

FIGS. 5 to 10 show various memory states of the BS1 memory SP1 of the base station BS1 and the MS1 ... MS6 memories SP2.1 ... SP2.6 of the mobile stations MS1 ... MS6 during the combining procedure of the base station BS1 with the six mobile stations MS1 ... MS6.

The BS1 memory SP1 has, for example, 10 BS1 storage locations X0 ... X9 which are used as follows:

BS1 storage location X0 is reserved, for example, as buffer location for the MS1 ... MS6 identification words IDW1 ... IDW6 of the mobile stations MS1 ... MS6.

The BS1 storage locations X1 ... X6 are reserved, for example, as read-only memory locations for the MS1 ... MS6 identification words IDW1 ... IDW6 of the mobile stations MS1 ... MS6 (subscribers TLN1 ... TLN6).

The BS1 storage location X7 is reserved, for example, as read-only memory location for the BS1 identification word IW1.

The BS1 storage location X8 is reserved, for example, as read-only memory location for the nominal legitimation word S-LW1.

The BS1 storage location X9 is reserved, for example, as read-only memory location for the 36 bits of the supplementary message.

The MS1 ... MS6 memories SP2.1 ... SP2.6 in each case have, for example, two MS1 ... MS6 storage locations Y0, Y1 which are used as follows:

The MS1 ... MS6 storage locations Y0 are reserved, for example, as read-only memory locations, in each case for the MS1 ... MS6 identification words IDW1 ... IDW6 of the mobile stations MS1 ... MS6.

The MS1 ... MS6 storage locations Y1 are reserved, for example, as read-only memory locations, in each case for the BS1 identification word IW1.

In addition, the mobile stations MS1 ... MS6 have MS1 ... MS6 main memories ASP2.1 ... ASP2.6 which are available as buffer locations for the BS1 identification word IW1.

Figure 5:
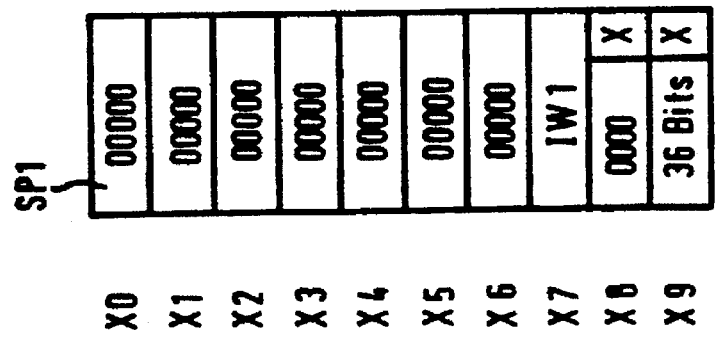

In detail:

FIG. 5 shows the BS1 memory state of the BS1 memory SP1, after the base station BS1 has left production.

FIG. 8 shows the MS1 ... MS6 memory states of the MS1 ... MS6 memories SP2.1 ... SP2.6, after the mobile stations MS1 ... MS6 have left production.

Figure 6:
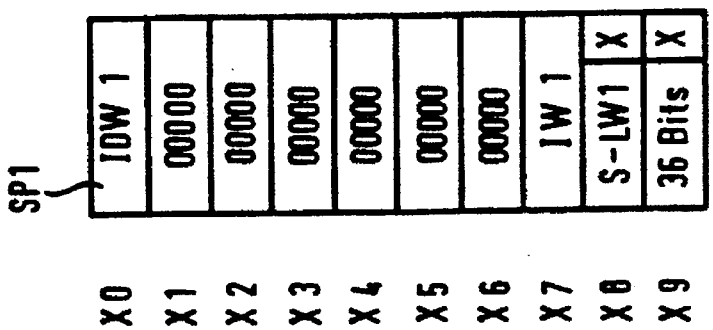

FIG. 6 shows the BS1 memory state of the BS1 memory SP1 when the base station BS1 is in the first RECEIVE state ("RECE-1").

FIG. 9 shows the MS1 ... MS6 memory states of the MS1 ... MS6 memories SP2.1 ... SP2.6, after the mobile stations MS1 ... MS6 have synchronized in the END OF SYNCHRONIZATION state ("RDY SYNC; M1/\M2").

FIG. 7 shows the BS1 memory state of the BS1 memory SP1 after the base station BS1 has combined with the mobile station MS1.

FIG. 10 shows the MS1 ... MS6 memory states of the MS1 ... MS6 memories SP2.1 ... SP2.6 after the base station BS1 has combined with the mobile station MS1.

Figure 11:
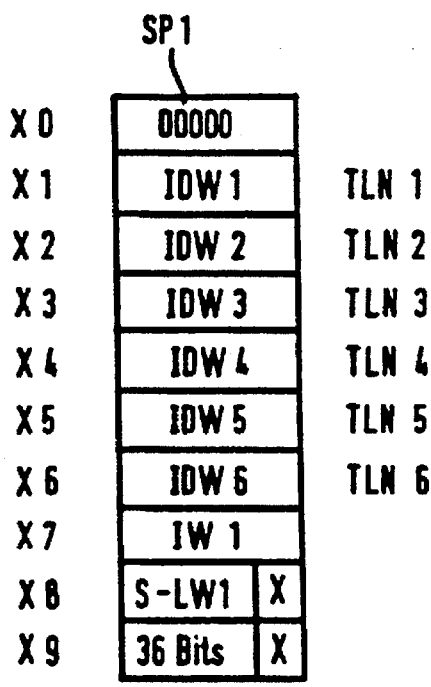
FIG. 11 shows the memory state of the base station after the combining with a number of mobile stations.

FIG. 11 shows the BS1 memory state of the BS1 memory SP1 after the base station BS1 has combined with the mobile stations MS1 ... MS6.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for combining transmitting/receiving devices of a cordless communication system to form a communicating unit, comprising the steps of:

(a) at a request stage (a1) bringing at least one first transmitting/receiving device and at least one second transmitting/receiving device into a combining-specific transmitting/receiving state, (a2) transmitting a first message by the first transmitting/receiving device which is received by the second transmitting/receiving device and acknowledged in the form of a return message, the first message and the return message being request-stage-specific messages, (b) mutually exchanging and storing device-individual identification words, in the transmitting/receiving devices, due to request-stage-specific messages at a registration stage, (c) transmitting, in addition to the first message and the return message mutually transmitted by the first and second transmitting/receiving devices, at least one further message, at least one of which is generated by control procedures at a user interface of a respective transmitting/receiving device, (d) acknowledging the further message transmitted by a transmitting/receiving device of the first and second transmitting/receiving devices by a receiving transmitting/receiving device of the first and second transmitting/receiving devices due to a correspondence found within each case reference information corresponding to the further message and stored in the receiving transmitting/receiving device, before the device-individual identification words are stored.

2. The process as claimed in claim 1, wherein, as further messages, a supplementary message is transmitted from the first transmitting/receiving device to the second transmitting/receiving device and a legitimation message generated by the control procedures at the second transmitting/receiving device is transmitted from the second transmitting/receiving device to the first transmitting/receiving device, in which process, in the case of a correspondence (1) of the supplementary message with the reference information stored in the second transmitting/receiving device, the second transmitting/receiving device is synchronized with the first transmitting/receiving device, (2) of the legitimation message with the reference information stored in the first transmitting/receiving device, the synchronization of the first transmitting/receiving device with the second transmitting/receiving device is legitimized.

3. The process as claimed in claim 2, wherein the first transmitting/receiving device is a base station and the second transmitting/receiving device is a mobile station, of a DECT cordless telephone.

4. The process as claimed in claim 2, wherein an actual legitimation word is transmitted as a message content in the legitimation message and a nominal legitimation word is contained in corresponding stored reference information.

5. The process as claimed in claim 2, wherein a supplementary word is transmitted as a message content in the supplementary message.

6. The process as claimed in claim 5, wherein a 36-bit-long system information field, freely available in a MAC layer in a DECT standard, is allocated to the supplementary word.

7. The process as claimed in claim 5, wherein codes of the cordless communication system are allocated to the supplementary word.

8. The process as claimed in claim 1, wherein in each case a number of first and second transmitting/receiving devices are combined in parallel.

9. The process as claimed in claim 1, wherein a number of first and second transmitting/receiving devices are progressively combined from a waiting loop.

* * * * *